(12) United States Patent
Lichtenberg

(10) Patent No.: US 6,310,283 B1
(45) Date of Patent: *Oct. 30, 2001

(54) PRESSURE RELIEF SYSTEM

(75) Inventor: Wolfgang Lichtenberg, Hannover (DE)

(73) Assignee: WABCO Standard GmbH, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/309,323

(22) Filed: Sep. 19, 1994

(30) Foreign Application Priority Data

Sep. 21, 1993 (DE) .................................................. 43 319 66

(51) Int. Cl.[7] ....................................................... H05K 5/00

(52) U.S. Cl. .................................. 174/17 R; 137/596.16; 251/30.03

(58) Field of Search .................... 137/596.16; 251/30.02, 251/30.03; 174/17 R

(56) References Cited

U.S. PATENT DOCUMENTS

| 4,345,620 | * | 8/1982 | Ruchser et al. | 137/596.16 |
| 4,617,961 | * | 10/1986 | Lichtenberg | 137/596.16 |
| 4,821,908 | | 4/1989 | Yost | 220/86 R |
| 5,039,069 | * | 8/1991 | Friederichs et al. | 137/596.16 |

FOREIGN PATENT DOCUMENTS

| 24 25 990 | 1/1975 | (DE) . |
| 34 04 189 | 8/1985 | (DE) . |
| 39 28 108 | 2/1991 | (DE) . |
| 41 18 834 | 12/1992 | (DE) . |
| 0 160 750 | 11/1985 | (EP) . |
| 2 654 694 | 5/1991 | (FR) . |

* cited by examiner

Primary Examiner—Joseph Waks
(74) Attorney, Agent, or Firm—Proskauer Rose LLP

(57) ABSTRACT

A pressure relief system comprises a control system which includes a housing with a housing chamber in which electrical equipment is located, and a valve system having a pressure relief device. The housing chamber is connected via a connecting device (e.g., a pipe conduit) to the pressure relief device, thereby protecting the electrical equipment contained in the housing chamber from occurrence of overpressure.

12 Claims, 2 Drawing Sheets

PRESSURE RELIEF SYSTEM

FIELD OF THE INVENTION

The instant invention relates to a pressure relief system for a control system having a housing and housing chamber to receive electrical equipment.

BACKGROUND OF THE INVENTION

The electrical components used in a control system are, depending on their type, partially or wholly non-resistant to pressure. The housing chamber containing the electrical equipment must, therefore, be able to breathe. In other words, no pressure higher or lower than atmospheric pressure may build up in the housing chamber, i.e., the housing chamber should be able to breathe. In this context it is immaterial whether the pressure originates in a terrestrial atmosphere or in an artificial atmosphere, e.g., a protective gas.

It is known to effect the breathing of the housing chamber via its own breathing device. This breathing device permits flow out of the housing chamber into the atmosphere, as well as in the opposite direction. An additional goal of the breathing device is to inhibit the penetration of pollutants and humidity into the housing chamber from the atmosphere. This goal is not attained to a satisfactory extent in all cases. Consequently, disturbances in operation may occur.

SUMMARY OF THE INVENTION

It is, therefore, an object of the instant invention to improve by simple means the operating safety of a pressure relief system for a control device.

In one embodiment of the invention a pressure relief system for, a control system with a housing is provided. A housing chamber is located in a housing. Electrical equipment is located in the housing chamber. A valve system having a pressure relief device is also provided, wherein the housing chamber is connected via a connecting device to the pressure relief device.

In another embodiment of the invention, the valve system is electrically controlled and the control system controls the valve system.

In another embodiment of the invention, the control system and the valve system have a common housing and the connecting device is a housing channel.

In still another embodiment of the invention, a gas drying system is installed in the connecting device.

In yet another embodiment of the invention, the gas drying system operates on a chemical principle.

BRIEF DESCRIPTION OF THE DRAWINGS

The invention is explained and additional advantages are indicated with reference to the following drawings.

DETAILED DESCRIPTION OF THE INVENTION

Figure 1:
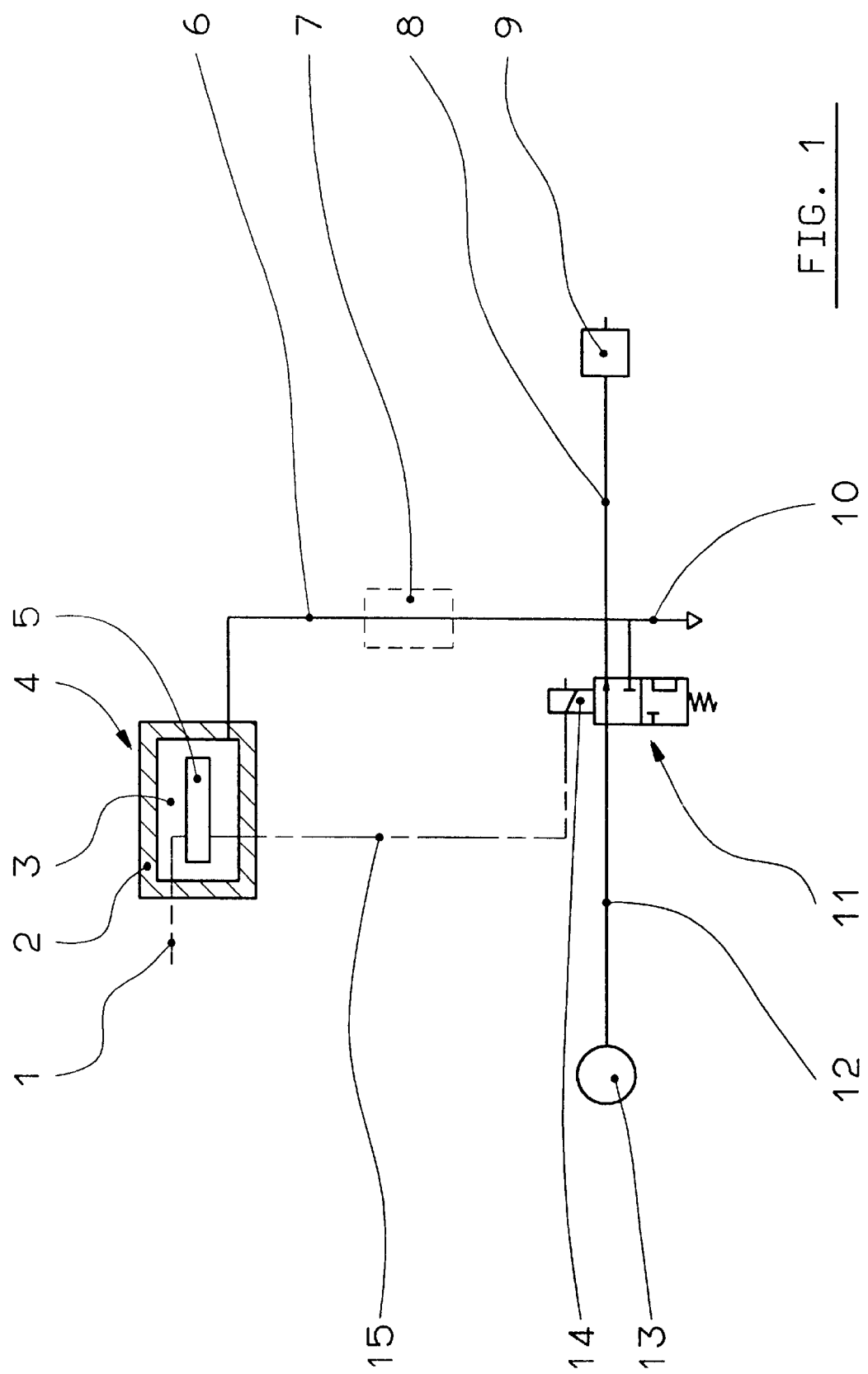
FIG. 1 schematically shows a basic arrangement of a pressure relief system for a control system according to the invention.

FIG. 1 schematically shows a control device (4) with a housing (2). The housing (2) contains a housing chamber (3). Electrical equipment (5), represented by a plate-bar, is installed in the housing chamber (3) and mounted in a known and suitable manner.

FIG. 1 also shows a valve system (11) in a standard schematic representation. The valve system is installed in the connection line (8,12) between a pressure reservoir (13) and a pressure consumer (9).

Additionally, the valve system (11) is provided with a pressure relief device (10) which opens into the atmosphere. The pressure relief device (10) is represented as a conduit going out from the valve system (11). In this embodiment, the pressure relief device (10) can move its outlet to an especially advantageous location, e.g., above the water level for a vehicle able to ford a body of water. However, the pressure relief device (10) can also be in the form of a housing channel which lets out into the atmosphere directly at the housing surface. It is also possible to connect a muffler and/or a protective filter or a combination of muffler and protective filter to the pressure relief device (10).

The housing chamber (3) of the housing (2) of the control device (4) is connected via a connecting device (6) to the pressure relief device (10). The connecting device (6) comprises, in the simplest case, a simple pipe conduit.

The valve system (11) can be controlled in two positions. In the first position, the pressure consumer (9) is connected to the pressure reservoir (13). In the second position, the valve system (11) separates the pressure consumer (9) from the pressure reservoir (13) and connects the pressure reservoir (9) to the pressure relief device (10).

In the pressure relief device (10) and, therefore, in the connecting device (6), as well as in the housing chamber (3), atmospheric pressure is constantly present as a rule. However, when the valve system (11) is in the second position, overpressure may occur in the pressure relief device (10) during the outflow of the pressure medium from the pressure consumer (9). As a rule, this overpressure is propagated only to a small extent, if at all, into the housing chamber (3) because the connecting device (6) acts as a choke with respect to the flow of the pressure medium when there is overpressure in the pressure relief device (10). However, such an occurrence is rare, and, as a rule, unhindered pressure compensation, in other words breathing, can take place between the housing chamber (3) and the atmosphere, i.e., via the connecting device (6) and the pressure relief device (10).

As mentioned above, the possibility of flow from the atmosphere to the housing chamber (3) is necessary for breathing. The atmospheric medium taking this route may be humid. However, as a rule, the humidity will not penetrate into the housing chamber (3), since it is precipitated in the pressure relief device (10) and/or in the connecting device (6).

In a further development of the exemplified embodiment, a gas drying device (7) can be installed in the connecting device (6). The gas drying device (7) promotes the removal of humidity from the atmospheric medium flowing in the direction of the housing chamber (3). It may be designed in any known manner, e.g., in the form of a heating element, or it may act on a chemical principle. In the latter case, the removal of humidity can take place by means of an adsorption/absorption medium, such as is used, for example, in an air dryer according to DE 33 15 580 A1. Designs of gas drying devices exist, which reinforce the choke effect of the connecting device, e.g., the system disclosed in DE 33 15 580 A1.

Clearly, the control of the valve system (11) can be effected in any known manner. The exemplified embodiment represents a special design in this respect. The valve system (11) is electrically controlled and the control device (4) is designed to control the valve system (11). The valve system (11) is provided with an electrical control system (14) for that purpose. The electrical control system is made in a known manner, e.g., in the form of a magnet. The control device (4) receives electrical command signals, processes them in the electrical equipment (5) and transmits corresponding command signals to the control system (14) of the valve system (11). The reception or transmission of the command signals is effected through electrical circuits (1,15) indicated by a dash-dot line.

Figure 2:
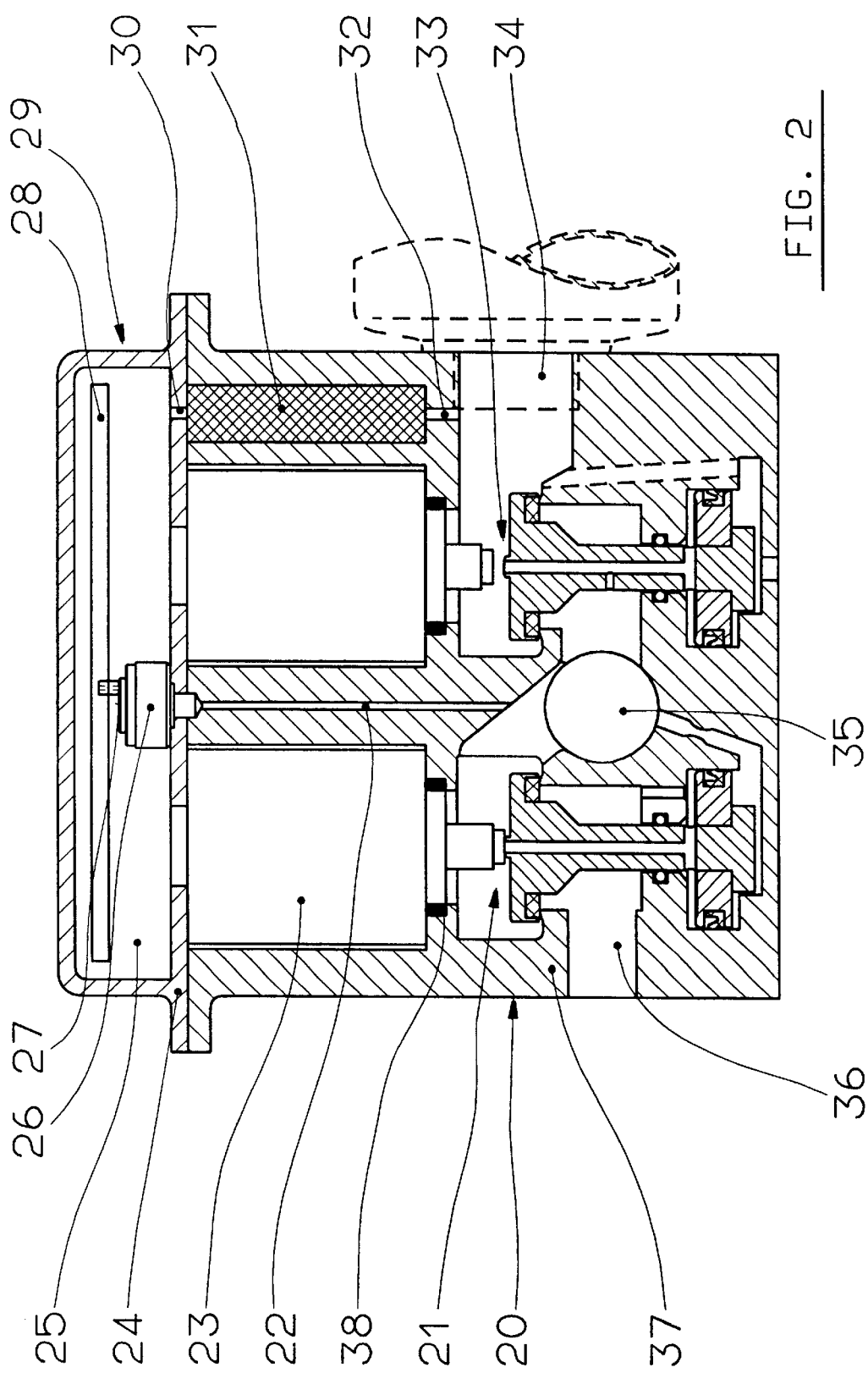
FIG. 2 shows a combination of a control device and a valve device.

In FIG. 2, the control system (29) and the valve system (20) have a common housing (24,37). The common housing (24,37) is composed of the control system housing (24) and the valve system housing (37). Each of these can comprise one part or several separate parts. In the embodiment shown, the two housings are connected by conventional, not designated, connecting elements.

The valve system (20) is provided with an inlet valve (21) and an outlet valve (33). The inlet (21) and outlet (33) valves are controlled electrically by magnets. The inlet valve (21) controls the connection of an inlet (36) to a working chamber (35). The outlet valve (33) controls the connection of the working chamber (35) to a pressure relief device (34). The pressure consumer, not shown in FIG. 2, is connected to the working chamber (35). The valve system (20) and its actuating magnets are identical to the valve system described in DE 37 29 226 A1 except for the valve housing (37) which is altered to produce the combination housing with the control system.

In this case, a pressure sensor (26) is part of the electrical equipment (26,28) housed in the housing chamber (25) of the control system housing (24). The pressure sensor (26) measures the pressure in the working chamber (35), which is also the pressure in the pressure consumer, and converts it into an electrical pressure signal. The pressure sensor (26) is provided with an active surface (not shown) which is subjected to the pressure in the working chamber (35) via a housing channel (22). The active surface is located at the bottom of the pressure sensor (26). The surface (27) across from the active surface of the pressure sensor (26), i.e., at the top of the pressure sensor (26), serves as a reference surface. This reference surface (27) must be constantly subjected to atmospheric pressure, at least during the evaluation of the pressure signals, to ensure reliable functioning of the installation for this embodiment.

In this case, the breathing of the housing chamber (25) is especially necessary because if the seal (38) of the actuating magnets (23) associated with the inlet valve (21) should leak, pressure medium may pass from the working chamber (35) past the actuating magnets (23) and into the housing chamber (25). However, the resulting pressure build-up which causes disturbances in operation is countered by a housing channel (30,31,32) extending from the housing chamber (25) through the housings (24,37) to the pressure relief device (34). The housing channel (30, 31, 32) plays the role of the connecting device (6) shown in FIG. 1.

A widening part (31) of the valve system (20) is provided inside the housing (37) for the housing channel (30,31,32). The widening part constitutes a buffer chamber for the atmospheric medium which changes during breathing between the housing chamber (25) and the pressure relief device (34) and effectively assists the choke effect of the housing channel (30,31,32) in view of the passage of overpressure peaks from the pressure relief device (34) into the housing chamber (25).

In another further development of the embodiment, a gas drying device, such as gas drying device (7) is installed in the widening part (31), as indicated by cross-hatching. The gas drying device functions as described above with reference to FIG. 1.

Barring anything to the contrary in the above, that which is stated in connection with one embodiment applies, in general, directly or in corresponding application to the other embodiment.

Finally, the person schooled in the art will recognize that the scope of protection of the invention is not exhausted in the described embodiments but covers all embodiments whose characteristics fall under the patent claims. It is particularly possible to implement the invention with any valve equipment having a pressure relief device.

What is claimed is:

1. A pressure relief system comprising a control system which includes a housing, a housing chamber located in said housing, and electrical equipment located in said housing chamber, and a valve system having a pressure relief device, wherein said housing chamber is always in communication with said pressure relief device via a connecting device.

2. The pressure relief system of claim 1, wherein said valve system is electrically controlled by said control system.

3. The pressure relief system of claim 2, further comprising a gas drying system installed in said connecting device.

4. The pressure relief system of claim 3, wherein said gas drying system operates on a chemical principle.

5. The pressure relief system of claim 1, wherein said control system and said valve system have a common housing and said connecting device comprises a housing channel.

6. The pressure relief system of claim 5, further comprising a gas drying system installed in said connecting device.

7. The pressure relief system of claim 6, wherein said gas drying system operates on a chemical principle.

8. The pressure relief system of claim 2, wherein said control system and said valve system have a common housing and said connecting device comprising a housing channel.

9. The pressure relief system of claim 8, further comprising a gas drying system installed in said connecting device.

10. The pressure relief system of claim 9, wherein said gas drying system operates on a chemical principle.

11. The pressure relief system of claim 1, wherein said gas drying system operates on a chemical principle.

12. The pressure relief system of claim 1, wherein said electrical equipment comprises a printed circuit board.

* * * * *